UNITED STATES PATENT OFFICE.

ARTHUR L. KENNEDY, OF NEW YORK, N. Y.

FERTILIZER.

No. 879,877.      Specification of Letters Patent.      Patented Feb. 25, 1908.

Application filed July 2, 1907. Serial No. 381,858.

*To all whom it may concern:*

Be it known that I, ARTHUR L. KENNEDY, a citizen of the United States, and a resident of the city of New York, in the State of New York, have invented certain new and useful Improvements in Fertilizers, of which the following is a specification.

The object of my present invention is to produce a fertilizer which shall have advantages over those with which I am familiar, in that it tends to keep the ground open and prevent caking; and in that the active materials are not immediately leached out by the first heavy rain, but continue in the vehicle for a considerable time, it gradually giving up fertilizing elements as they may be needed in sustaining plant life.

In preparing my improved fertilizer, I first take corncobs, dried and ground fine, and then with a mixing machine, I mix with them short asbestos fiber, in proportions of about 15 lbs. to 100 lbs. of the ground cobs. This is then soaked with a solution of acid phosphate of lime, 8% nitrate of soda, 4% muriate of potash, 3.5 to 4%. After the solid material has taken up as much of the solution as it will carry, I add finely ground clay or marl, as a filler, until 200 lbs. weight is obtained. It is of importance that the solid materials shall be thoroughly incorporated and mixed so that they are completely blended. The dampened mass is then rubbed through a sieve, so that it is obtained in granular form, preferably quite small, about the size of millet-seed; the grains are then dried at about 175° Fahrenheit until the superfluous moisture is removed, leaving only enough in them to make the grains keep their shape; the grain is of a light grayish color, the chemicals are thoroughly distributed and the grain is hard enough to keep its form without powdering or wasting.

I may vary the above outlined process of mixing, but in general, I have found that introducing the solution of chemicals to the ground cob first, gives the most satisfactory result. If the clay or marl be very dry, a sufficient amount of moisture must be used, say about 5%, so as to make a good and complete mixture of the material, still leaving it sufficiently plastic for subsequent treatment.

The percentages of fertilizing chemicals may be varied in some special cases, but I have found those above outlined to be satisfactory. Fertilizer made in this way, with total available percentages somewhat less than 3% of phosphoric acid, 2% of potash, and 1.5% of nitrate of soda, will produce excellent growths of small crops.

In the improved fertilizer above outlined, the fertilizing elements are held in the soil and fed out gradually as required by the growing plant. None of it goes to waste by being washed out in the drainage, and the total amount required for strong growth is less than with the ordinary fertilizers, while its physical constitution is such as to keep the soil open and light preventing it baking or caking. The asbestos curls in making the fertilizer, but in the soil it gradually expands and thus tends to keep the soil loose, conserving the natural moisture and promoting the growth. The cellulose base also holds the soil moisture, with the asbestos acting to keep the soil in the vicinity of the roots always open, moist and light; while the use of the clay or marl prevents the soil becoming sour, and the slow decay of the base prevents the accumulation of matter which would be a source of insect life as is frequently a trouble with organic manures; in fact crops, which I have treated with this fertilizer, are singularly free from insect troubles.

Having thus described my invention, what I claim and wish to protect by Letters-Patent of the United States is:

1. The new fertilizer described, composed of ground cellulose material, short asbestos fiber, marl, and fertilizing mineral salts, all in granular form.

2. The new fertilizer described, composed of ground corncobs, short asbestos fiber, and marl, containing phosphate of lime, nitrate of soda, and muriate of potash.

3. The new fertilizer described, composed of ground corncobs impregnated with phosphate of lime, nitrate of soda, and muriate of potash; short asbestos fiber, and marl; in granular form, dry and hard.

4. The new fertilizer described, composed of ground corncobs impregnated with calcium phosphate, sodium nitrate, and potassium muriate, in relative proportions of about two parts of the calcium salt to about one of each of the others, with short asbestos fiber, and marl; in hard, dry, granular form, substantially as set out.

In witness whereof I have hereunto set my name in the presence of two witnesses.

ARTHUR L. KENNEDY.

Witnesses:
T. J. JOHNSTON,
ANITA BURKE.